US007376896B2

(12) United States Patent
Ullmann et al.

(10) Patent No.: US 7,376,896 B2
(45) Date of Patent: May 20, 2008

(54) SYSTEM FOR RECORDING WORLD WIDE WEB BROWSING SESSIONS NAVIGATION ON A REAL-TIME BASIS AND FOR SUBSEQUENTLY DISPLAYING THE RECORDED SESSIONS AS SURROGATE BROWSING SESSIONS WITH USER ENABLED REAL-TIME MODIFICATION

(75) Inventors: Cristi Nesbitt Ullmann, Austin, TX (US); Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 10/047,116

(22) Filed: Jan. 15, 2002

(65) Prior Publication Data

US 2003/0132957 A1  Jul. 17, 2003

(51) Int. Cl.
*G06F 17/00* (2006.01)
*H04N 7/173* (2006.01)
(52) U.S. Cl. ............... 715/704; 715/738; 725/109
(58) Field of Classification Search ............... 345/738, 345/704; 725/109; 715/738, 704
See application file for complete search history.

(56) References Cited

U.S. PATENT DOCUMENTS

| 5,717,879 | A | 2/1998 | Moran et al. ............... 395/339 |
|---|---|---|---|
| 5,809,250 | A | 9/1998 | Kisor ..................... 395/200.57 |
| 5,944,791 | A * | 8/1999 | Scherpbier .................. 709/218 |
| 6,144,991 | A | 11/2000 | England ..................... 709/205 |
| 6,189,024 | B1 | 2/2001 | Bauersfeld et al. ......... 709/203 |
| 6,535,909 | B1 * | 3/2003 | Rust .......................... 709/204 |
| 6,546,405 | B2 * | 4/2003 | Gupta et al. ................ 715/512 |
| 6,665,835 | B1 * | 12/2003 | Gutfreund et al. ....... 715/500.1 |
| 6,693,661 | B1 * | 2/2004 | Vanderwilt et al. ...... 348/14.01 |
| 6,705,869 | B2 * | 3/2004 | Schwartz .................... 434/219 |

* cited by examiner

*Primary Examiner*—Weilun Lo
*Assistant Examiner*—Sara M. Hanne
(74) *Attorney, Agent, or Firm*—Jerry B. Kraft; Mark S. Walker

(57) ABSTRACT

An implementation for the generation of a surrogate Web browsing session at a Web receiving display station by a user who does the basic browsing or searching for a principal user, e.g. the physically limited individual or the executive/professional ordering the browsing session. A user to is enabled to interactively navigate the Web through a sequence of linked hypertext documents in a browsing session at a receiving display station in combination with recording on a real-time basis, keystroke by keystroke and mouse point and click by point and click, page by page and selected hyperlink by selected hyperlink, the interactive navigation of said user in said browsing session.

28 Claims, 16 Drawing Sheets

BROWSING SESSION

US 7,376,896 B2

SYSTEM FOR RECORDING WORLD WIDE WEB BROWSING SESSIONS NAVIGATION ON A REAL-TIME BASIS AND FOR SUBSEQUENTLY DISPLAYING THE RECORDED SESSIONS AS SURROGATE BROWSING SESSIONS WITH USER ENABLED REAL-TIME MODIFICATION

CROSS-REFERENCE TO RELATED COPENDING PATENT APPLICATIONS

The following patent application is assigned to the assignee of the present invention, filed concurrently herewith and covers subject matter related to the subject matter of the present invention: A SYSTEM FOR DELAYED VIEWING OF SELECTED DOCUMENTS HYPERLINKED TO HYPERTEXT DOCUMENTS RECEIVED AT A USER INTERACTIVE RECEIVING DISPLAY STATION IN A COMPUTER CONTROLLED COMMUNICATION NETWORK, Cristi N. Ullmann et al., Ser. No. 10/047,095. This application is hereby incorporated by reference.

1. Technical Field

The present invention relates to computer managed communication networks such as the World Wide Web (Web), and particularly to recording of Web browsing sessions for subsequent use, review and analysis.

2. Background of Related Art

The past decade has been marked by a technological revolution driven by the convergence of the data processing industry with the consumer electronics industry. The effect has, in turn, driven technologies that have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct hyperlinks between Web pages embedded in such Web pages. This even further exploded the use of the Internet or Web.

It is now possible for the Web browser or wanderer to spend literally hours going through document after document in often less than productive excursions through the Web. These excursions often strained the users' time and resources. A significant source of this drain is in the Web page itself (the basic document page of the Web). In the case of Web pages, we do not always have the situation of a relatively small group of professional designers working out the human factors; rather, in the era of the Web, anyone and everyone can design a Web page or document. As a result, Web pages are frequently setup and designed in an eclectic manner. Often Web pages or documents are set up through loose business, professional, social and educational configurations with general trade or public input of Web pages. Although many Web pages are professionally designed and, thus, relatively efficient to use, there are still a great many Web pages that are very cumbersome to access and to use, particularly when the user is making in depth searches.

Thus, there are many situations where individuals who could greatly benefit from the vast database resources available through the Web lack the skills and/or the time required to browse the Web in order to search and develop the information that would be of the greatest value to them.

Two examples of such individuals are: 1) leaders and executives in technology, business and academia who chose to devote most of their time and energies to their professions and disciplines, and, thus, have less time to develop their computer and Web browsing skills; and 2) the physically handicapped or impaired. In order for physically impaired people to use the Web, they are required to make almost continual cursor or pointer control movements. One source of frustration to physically and visually impaired computer users has been movement of the screen cursor and like movable screen indicia to make the required user-interactive selections. Despite all of the great changes that have been made in the computer industry, the screen cursor or pointer controlled manually by the user still remains the primary human-computer interface. The user still commands the computer, primarily through manual pointing devices such as mice, joy sticks and trackballs that control the on-screen cursor movements. It must be noted that the principles involved in such pointing devices were developed over a generation ago when most of the people involved in interfaces to computers were computer professionals who were willing to invest great amounts of time in developing computer skills. These cursor control devices translate relatively precise orthogonal manual movements into precise cursor movements on the display screen. Users with poor hand-eye coordination due to poor eyesight, physical impairment, feebleness or other dexterity problems find the computer mouse to be quite stressful and frustrating. Consequently, Web browsing or searching is often impractical.

Thus, such 1) high end professionals and 2) physically impaired people have others with greater computer skills and dexterity conduct their Web browsing and searching. This delegation of the Web browsing function presents its own set of problems. In the case of the high end executives and professionals, these individuals cannot possibly convey to the searchers the knowledge and skills that these professionals have in their own disciplines. Consequently, the value of the searches are limited by the searcher's limited knowledge understanding of the ramifications of the problem to be searched. Since Web searching involves a continuous sequence of decisions as to which of several hyperlink threads to pursue. The value of the search is dependent on which of the many hyperlink threads is pursued. Thus, conventionally, when the high level professional requests a search, the results are usually a list of the Web documents or the URL's (Uniform Resource Locations) of the documents that the searcher has selected based upon the hyperlink threads that the searcher has selected. There is insufficient information as to which hyperlink threads the searcher has chosen to ignore or discard.

The physically impaired user is also subject to these Web search limitations, but, in addition, he still has the problems involved in navigating to his documents of choice in the search lists or in navigating to the appropriate URLs.

SUMMARY OF THE PRESENT INVENTION

The present invention is directed to easing the above-described problems of both the professionals/executives and the physically impaired, as well as any others who have Web browsing or search sessions conducted on their behalf on the Web. (The terms Web and Internet are used interchangeably in this specification.) The invention involves the generation of a surrogate Web browsing session at a Web receiving display station by a user who does the basic browsing or searching for a principal user, e.g. the physically limited individual or the executive/professional ordering the browsing session. The implementation comprises means enabling a user to interactively navigate the Web through a sequence of linked hypertext documents in a browsing session at a receiving display station in combination with means for recording on a real-time basis said interactive navigation of said user in said browsing session. Then there are means enabling a subsequent user to follow the path of said recorded navigation on a real-time basis in a surrogate browsing session on a display device, in combination with means enabling such subsequent user following said path of said recorded navigation in said surrogate session to modulate the real-time of said navigation on said display device. In other words, the exact Web browsing recorded keystroke by keystroke and mouse point and click by point and click, page by page and selected hyperlink by selected hyperlink is subsequently played back by the principal user on a real-time basis in the surrogate browser session so that the principal user sees exactly what the browsing user or searcher saw.

An important aspect of the invention is that the subsequent principal user is enabled to modulate the real-time of the playback. This is important to the professional/executive type of user in that he has an opportunity to review not only the search results but the actual search process, i.e. did the searcher conduct the search in the best way possible? For example, the principal, based upon his background knowledge, may wish to skim through certain Web pages of little interest even though the search proceeded through such pages slowly and tediously on the real-time basis. On the other hand, the professional principal may recognize as significant a Web page that the searcher skipped through. The principal is enabled to proceed more slowly or quickly through the real-time recorded Web pages during the surrogate session playback. In addition, the principal may recognize that the searcher because of his limited background failed to pursue a browsing or search thread through a particular hyperlink while pursuing a less consequential thread through another hyperlink in a Web page. The ability to slow down the real-time in the surrogate session permits the principal more time to decide that certain search threads should have been taken while others should have been ignored. This may be corrected ordering supplementary Web browsing/searching or possibly by pursuing hyperlinks already saved during the basic browsing session, as will be subsequently described in greater detail.

With respect to the physically impaired user, the real-time recorded session dramatically reduces the number of awkward point and click or keystroke movements required of him. Actually, he only needs to do any pointing should he desire search modifications. The ability to slow down the real-time of the surrogate playback session permits more time for the manually or visually impaired to make and implement their decisions.

The real-time recorded user movements of course include Web page scrolling and selection of particular hyperlinks on a Web page to access other linked documents. The invention includes the provision of displayed time lines in the recorded and surrogate browsing sessions. The user is enabled to insert time marks at points in these time lines to indicate significant points in the browsing sessions which the subsequent user may jump back to as needed during the surrogate browsing session. The surrogate browsing session may be carried out off-line from the Web network. Conventional Web browser programs may be modified to carry out the present invention. The surrogate Web browsing sessions may be stored in display computer storage and memory and then played back on such computer displays. The surrogate session may be stored on CD's and played back on display computers. The surrogate Web browsing session may also be recorded on video tape or Cd's and played back on video tape players or CD players.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
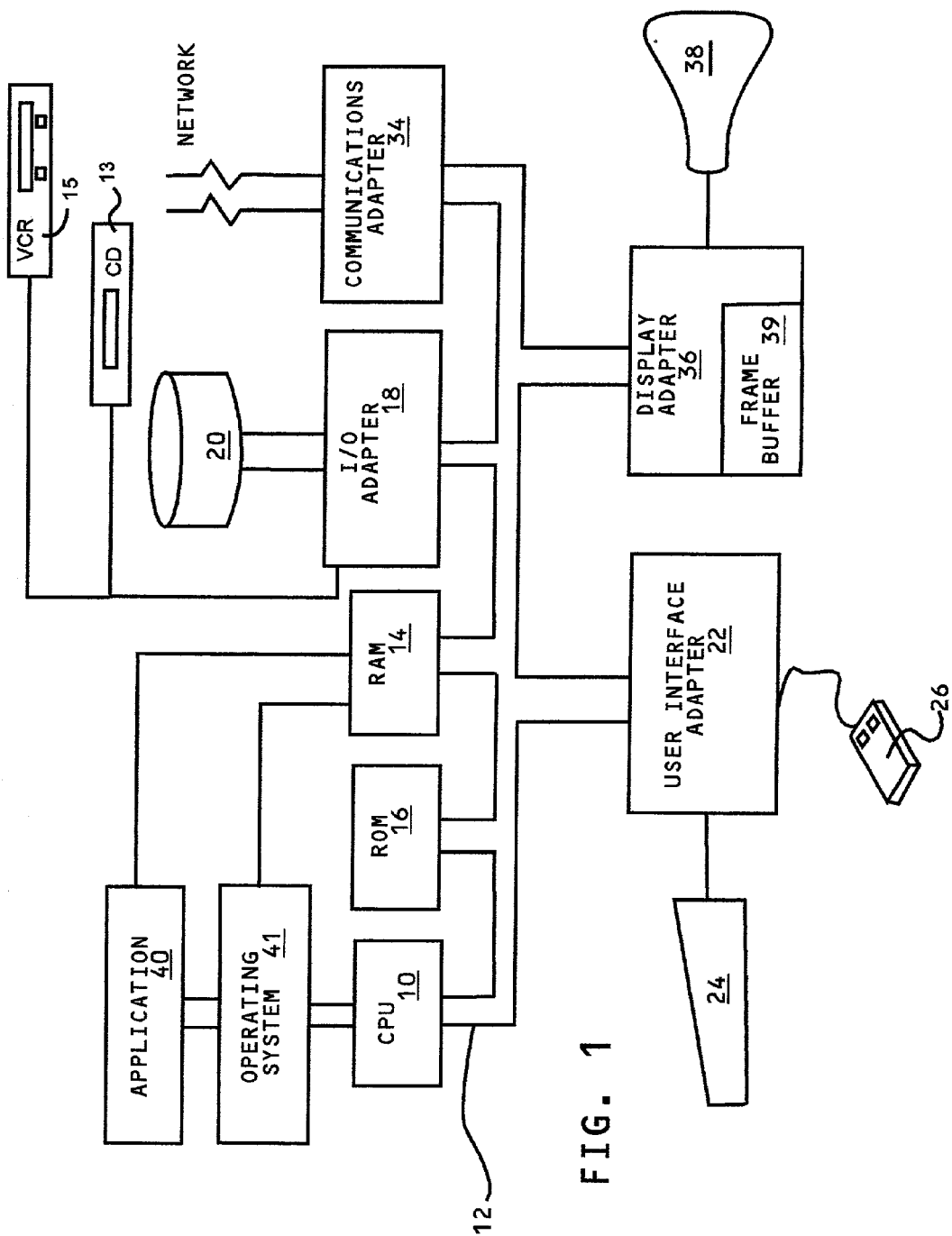
FIG. 1 is a block diagram of a data processing system including a central processing unit and network connections via a communications adapter that is capable of functioning as a user interactive Web station for receiving Web documents in order to record and create the surrogate Web browsing session of this invention.

Referring to FIG. 1, a typical data processing terminal is shown which may function as the computer controlled network terminals i.e. Web display stations used for receiving Web pages and for recording on a real-time basis the user Web navigation so as to generate the corresponding real-time surrogate Web browsing sessions according to the present invention. A central processing unit (CPU) 10, such as one of the PC microprocessors or workstations, e.g. eServer pseries available from International Business Machines Corporation (IBM), or Dell PC microprocessors, is provided and interconnected to various other components by system bus 12. An operating system 41 runs on CPU 10, provides control and is used to coordinate the function of the various components of FIG. 1. Operating system 41 may be one of the commercially available operating systems such as IBM's AIX 6000™ operating system or Microsoft's WindowsMe™ or Windows 2000™, as well as UNIX and other IBM AIX operating systems. Application programs 40, controlled by the system, are moved into and out of the main memory Random Access Memory (RAM) 14. These programs include the program of the present invention for recording on a real-time basis the user Web navigation so as to generate the corresponding real-time surrogate Web browsing sessions which will be described hereinafter in combination with any conventional Web browser at the receiving Web station, such as Netscape 3.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside Internet or Web network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs for generating surrogate Web browsing sessions according to the present invention.

Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

The real-time recording of the navigation during a Web browsing session, hereinafter be described in greater detail, may be stored on the Web station computer itself in FIG. 1 in storage device 20, and moved into RAM 14 in segments to be displayed on display 38 as it is played back during the surrogate browsing sessions. It may also be recorded on either CD recorder player 13 or VCR recorder player 15 which are connected to the system via an appropriate I/O adapter 18. The recorded sessions on either VCR 15 or CD recorder 13 may subsequently be played back through the terminal system on display 38 or on the playback facilities of either CD 13 or VCR 15 through an independent off-line display device.

Before going further into the details of specific embodiments, it will be helpful to understand from a more general perspective the various elements and methods that may be related to the present invention. Since a major aspect of the present invention is directed to documents, such as Web pages, transmitted over networks such as the Web, an understanding of such networks and their operating principles would be helpful. We will not go into great detail in describing the networks to which the present invention is applicable. Reference has also been made to the applicability of the present invention to a global network such as the Internet or Web. For details on Internet nodes, objects and links, reference is made to the text, *Mastering the Internet*, G. H. Cady et al., published by Sybex Inc., Alameda, Calif., 1996.

The Internet or Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images. This displayable information may be still, in motion or animated, e.g. animated GIF images.

Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly at pp. 637–642, on HTML in the formation of Web pages. The images on the Web pages are implemented in a variety of image or graphic files such MPEG, JPEG or GIF files, which are described in the text, *Internet: The Complete Reference, Millenium Edition*, Young et al., 1999, Osborne/McGraw-Hill, particularly at pp. 728–730.

In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* text: Chapter 19, pp. 419–454, on the Netscape Navigator; Chapter 20, pp. 455–494, on the Microsoft Internet Explorer; and Chapter 21, pp. 495–512, covering Lynx, Opera and other browsers.

Aspects of the present invention will hereinafter be illustrated through the use of object oriented programming embodiments, particularly the Java program. The following background should be of help. The computer and communications industries have been extensively participating in the development and continual upgrading of object oriented programming systems, such as the Java system. For details and background with respect to object oriented programming systems, such as the Java programming system, C++ and others, reference may be made to some typical texts: *Just Java*, 2nd Edition, Peter van der Linden, Sun Microsystems, 1997; and *Thinking in Java*, Bruce Eckel, Prentice Hall PTR, 1998. The functions to be described may be especially effectively implemented using Java™ 1.2 or *Java Swing*. Java 1.2 is detailed and covered in the text *Java Swing*, Robert Eckstein et al., published by O'Reilly and Associates, Calif. 1998.

Figure 2:
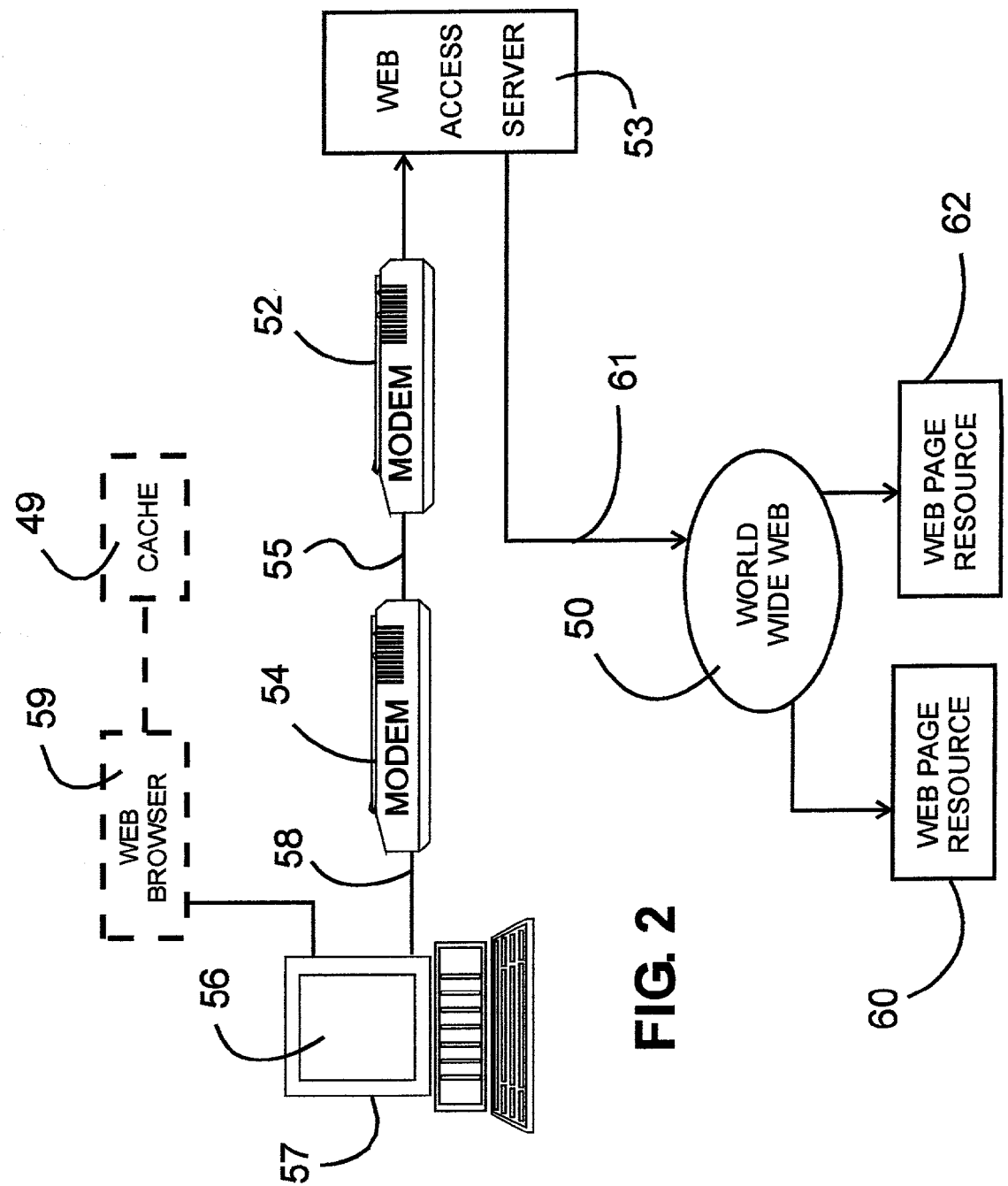
FIG. 2 is a generalized diagrammatic view of a Web portion showing how the Web may be accessed to and from the Web stations through browser applications for the requesting of Web pages in order to create the surrogate Web browsing sessions of the invention.

A generalized diagram of a portion of the Web, which the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56, which is one of a sequence of Web pages containing hyperlinks to other Web pages or documents. The computer 57 under the control of the Web browser program 59 supported by browser cache 49 will navigate through the Web as will hereinafter be described, and will record and track the navigation real-time to generate the surrogate Web browsing session.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 that are linked 61 to the Web 50. The Web servers 53, which also may have the computer structure described with respect to FIG. 1, may be maintained by an Internet Service Provider (ISP) to the client's display terminal 57. The Web server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Web 50 via linkage 61. The Web browser program 59 operates within the display terminals 57 to control the communication with the Web access server 53 to thereby download and display the accessed Web pages 56 on terminal 57. The Web access server 53 uses one of the previously described search engines 51 to access via the Web 50 the desired sequence of Web pages from appropriate Web resources such as databases 60 and 62. Web browser 59 will carry out the functions of recording the real-time navigation so that the recorded navigation will be available for the surrogate browsing sessions that are, preferably, conducted off-line with respect to the Web.

Figure 3:
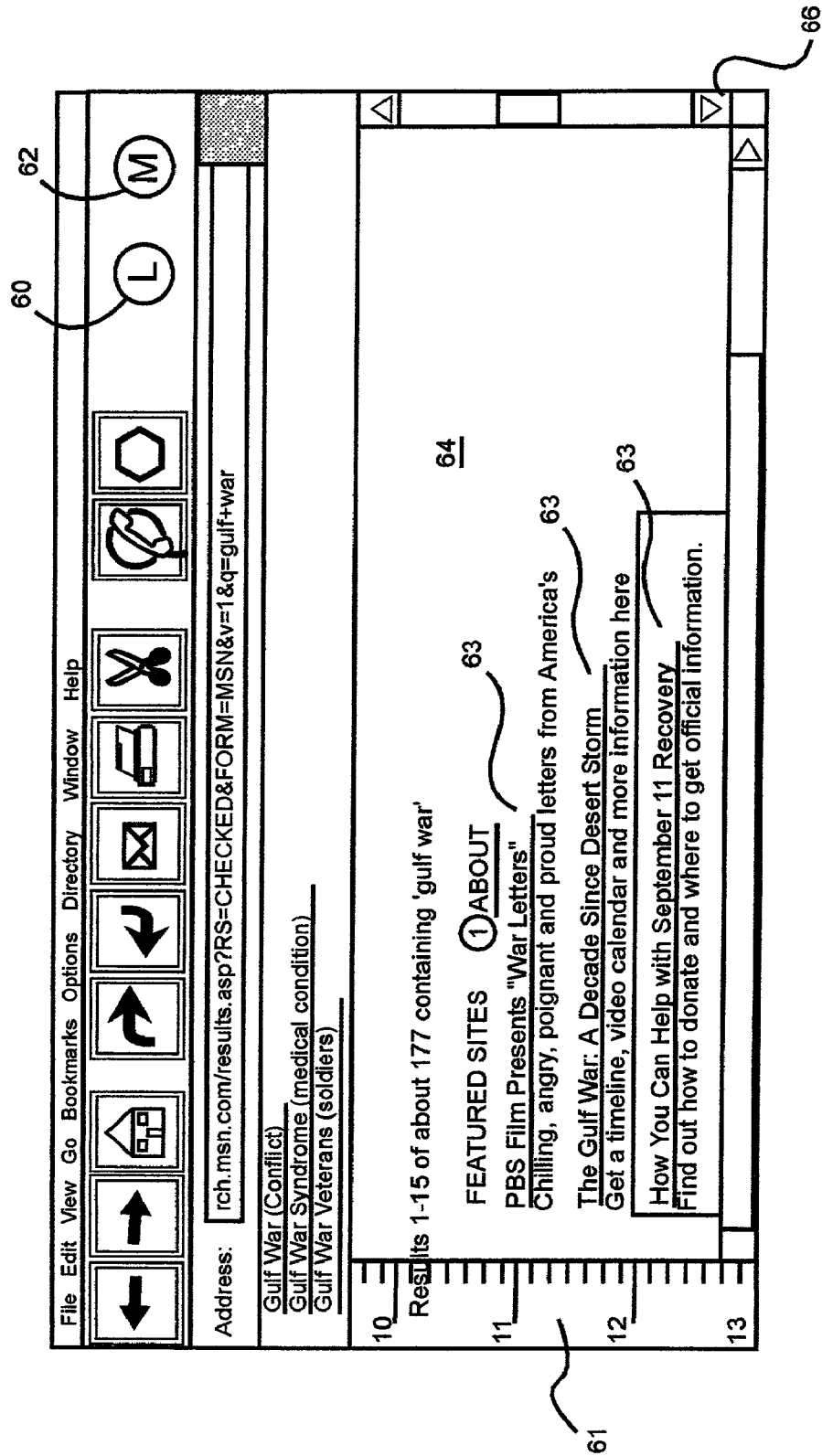
FIG. 3 is a diagrammatic view of a Web page displayed through a browser at a receiving display station set up to illustrate the initial page in a Web browser session that is being recorded real-time in accordance with the present invention with a running time line that is shown on the display being recorded and will be shown when the recorded Browsing session is replayed as a surrogate browser session.
Figure 12:
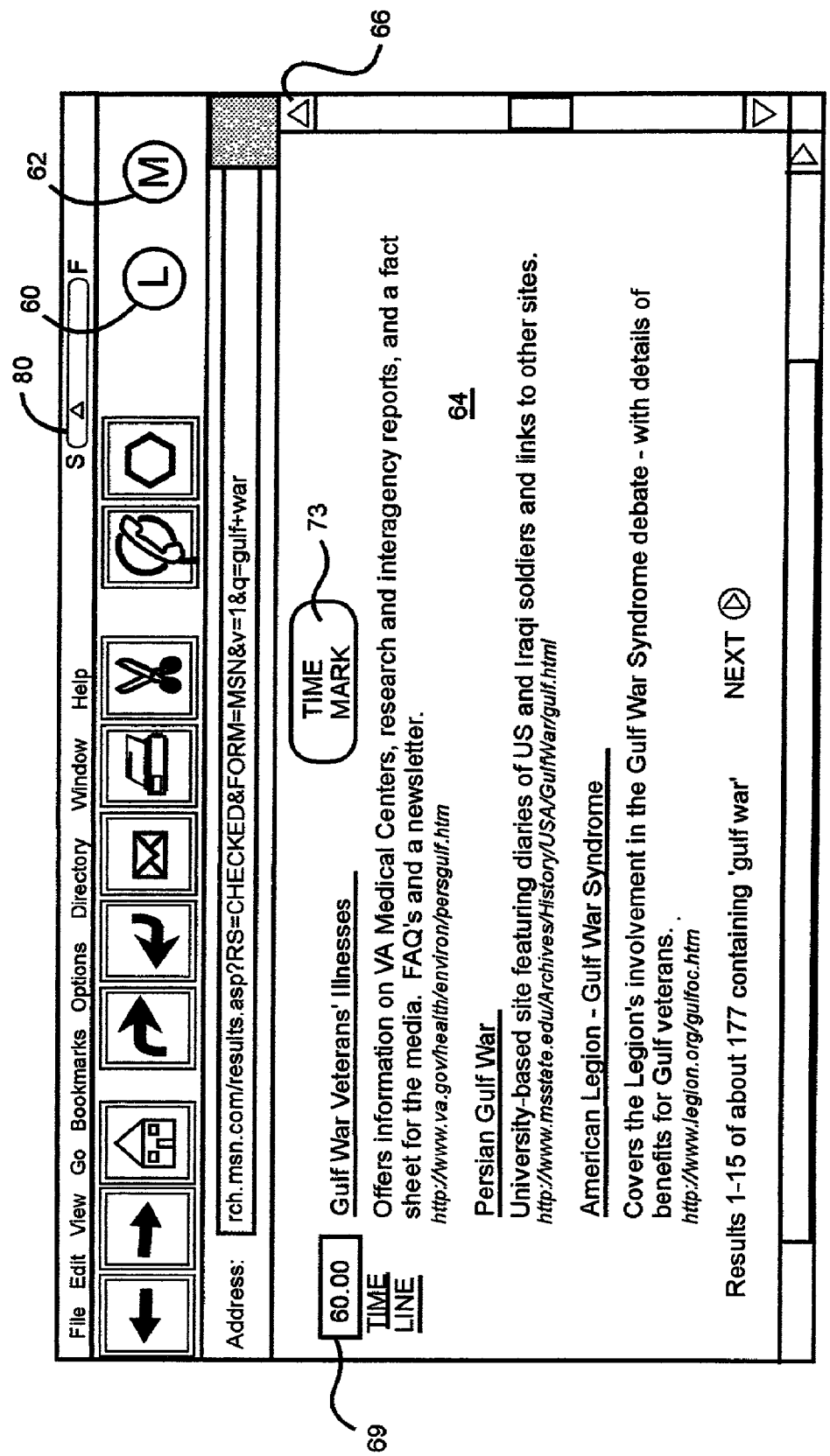
FIG. 12 is the diagrammatic display view of FIG. 3 illustrating a point in the Web page that results from scrolling, and at which the user is enabled to time mark a significant point in the browsing session.

Now, with respect to FIGS. 3 and 12, we will provide an illustrative example of how the present invention may be used for the creation of surrogate Web browsing sessions by the real-time recording of all navigation steps followed by the user in navigating through the Web. As the first step in the recorded navigation, Web page 64, FIG. 3, is an illustration of the displayed Web page 56 in FIG. 2. This standard page may contain text, graphics and images, as well as hyperlinks 63 to other Web documents. Also in the title/menu bar, there are a pair of buttons: "M", 60 to time mark the document along the running time line 61. The time marking of points in the recorded Web browser session will be subsequently described in greater detail. There is also an "L" (Look-at-Link-Later) button 62 that the user may click on to put the Web page into the mode described in the above-mentioned copending Cross-Referenced application, wherein the user is enabled to select hyperlinks for later or delayed viewing of the documents linked to such selected hyperlinks.

At the outset of this description of the diagrams 3 through 12, it should be noted that the continuous capturing of all of the scrolling driven through scroll bars 66, as well as the mouse and/or keystrokes in navigating through the hyperlinks in the Web pages are implemented on a real-time basis by the *Java Virtual Machine*. The basic functions of the *Java Virtual Machine* and its relations to objects therein and to the computer operating system, such as operating system 41, is described in detail at pp. 455–461 of the text *Java Jump Start*, Noel Enete, published by Prentice Hall, N.J., 1997. The developer-user through an input device such as mouse 26 through operating system 41, FIG. 1 interactively interfacing with application program 40. Display interface requirements are provided by the graphics engine of operating system 41, e.g. the graphics/text functions of Windows 2000™, which in turn translates the screen-by-screen dynamic pixel array layouts provided by the application 52 in *Java Virtual Machine* 54 for the interactive developer/user layouts. These pixel arrays are provided through display adapter 36 to frame buffer 39 which maintains the user interactive pixel array panels on display 38.

In the same recording of the navigation on a real-time basis, in a continuous flow, use is made of the dynamic function of the Java program to establish a repetitive pattern in which the screen gets automatically repainted every fractional second time interval to thus create a sense of user movement, not unlike that in simple animation. The continuous movement of the time line or tracked changes in the time are similarly dynamically captured. This Java routine for dynamic continuous screen capturing is described in detail in the above referenced text, *Java Jump Start*, Chapter 8 at pp. 89–103.

Figure 7:
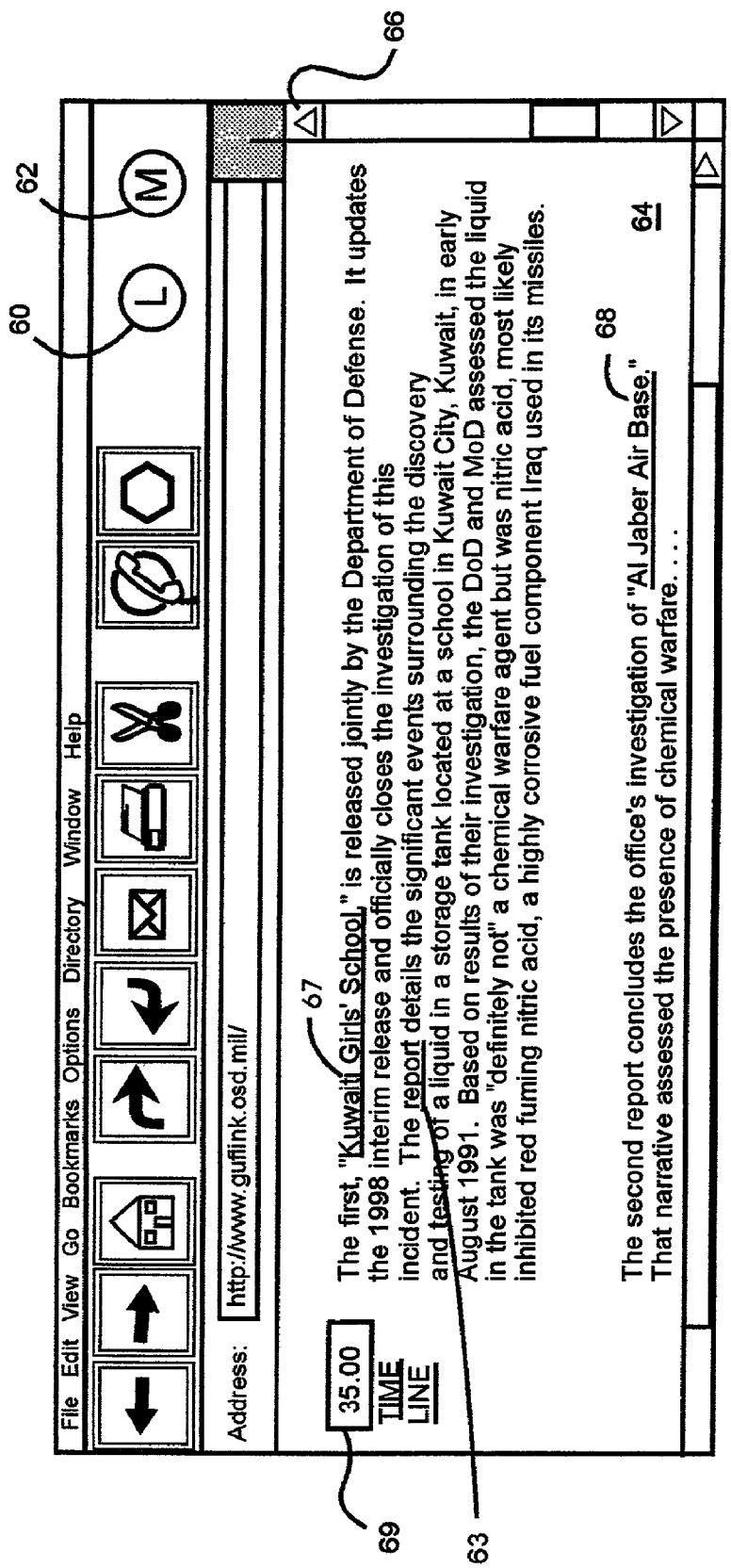
FIG. 7 is the diagrammatic display view of FIG. 6 illustrating a subsequent point in the Web page that results from scrolling.

Insofar as providing a time line or, even more conveniently, a running clock label for the same purpose as illustrated commencing with FIG. 7, *Java Swing* or *Java* 1.2, conveniently provides a Timer Class as described in the above-mentioned text *Java Swing*, Robert Eckstein et al.

Figure 4:
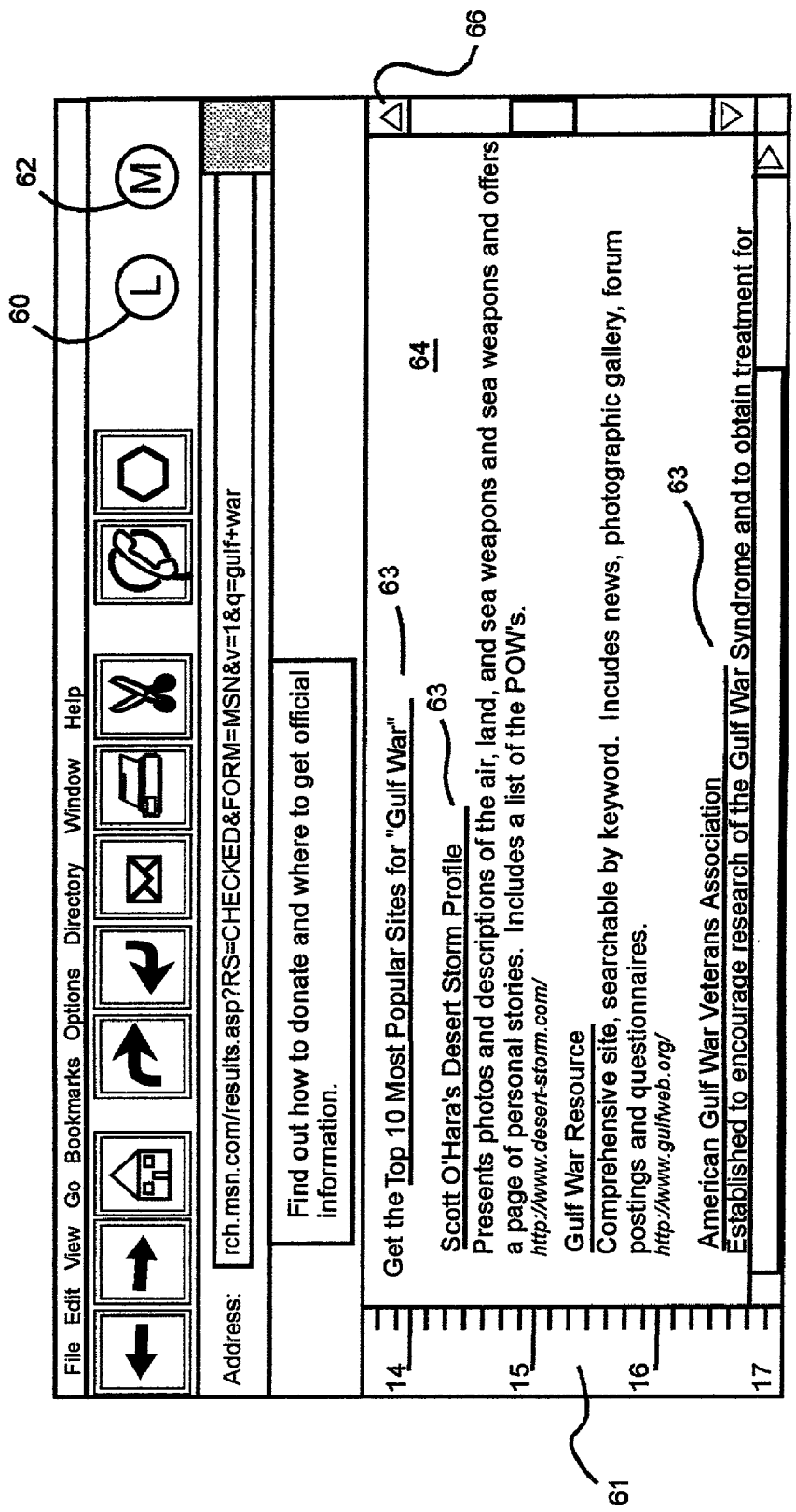
FIG. 4 is the diagrammatic display view of FIG. 3 illustrating a subsequent point in the Web page that results from scrolling.
Figure 5:
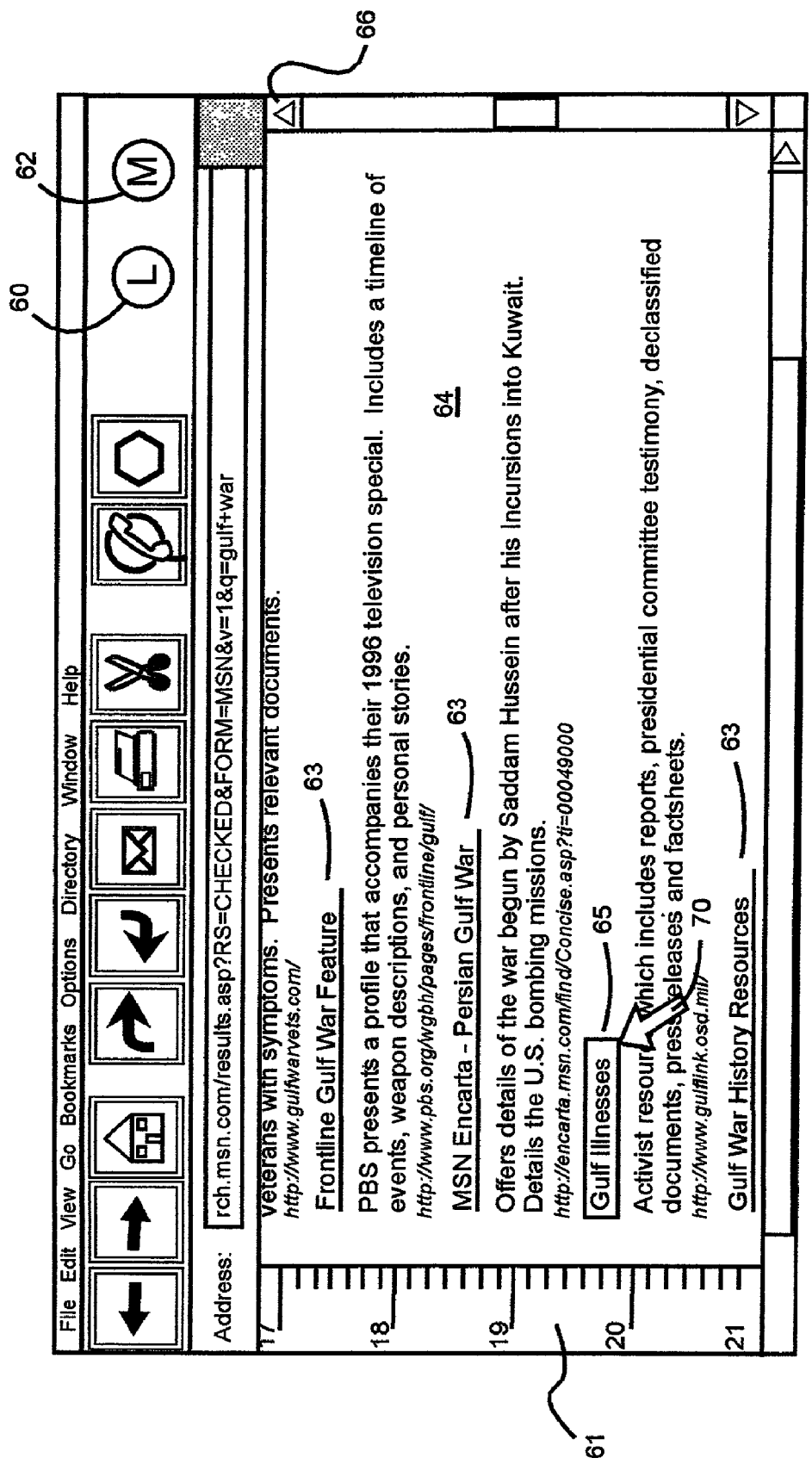
FIG. 5 is the diagrammatic display view of FIG. 3 illustrating a subsequent point in the Web page at which a hyperlink to a linked document is selected.
Figure 6:
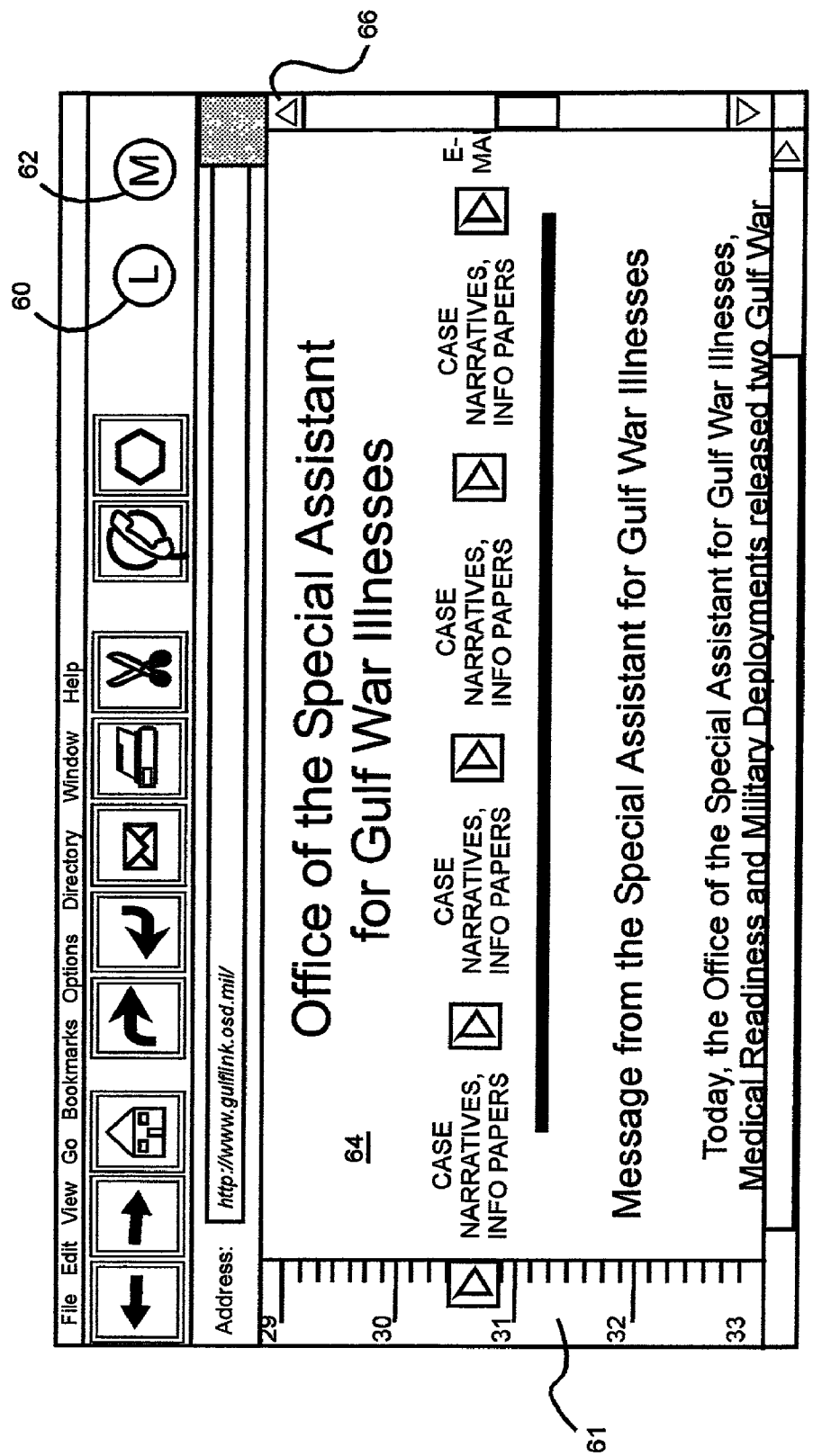
FIG. 6 is a diagrammatic view of the displayed linked Web page resulting from the selection of the hyperlink selected in FIG. 5.
Figure 8:
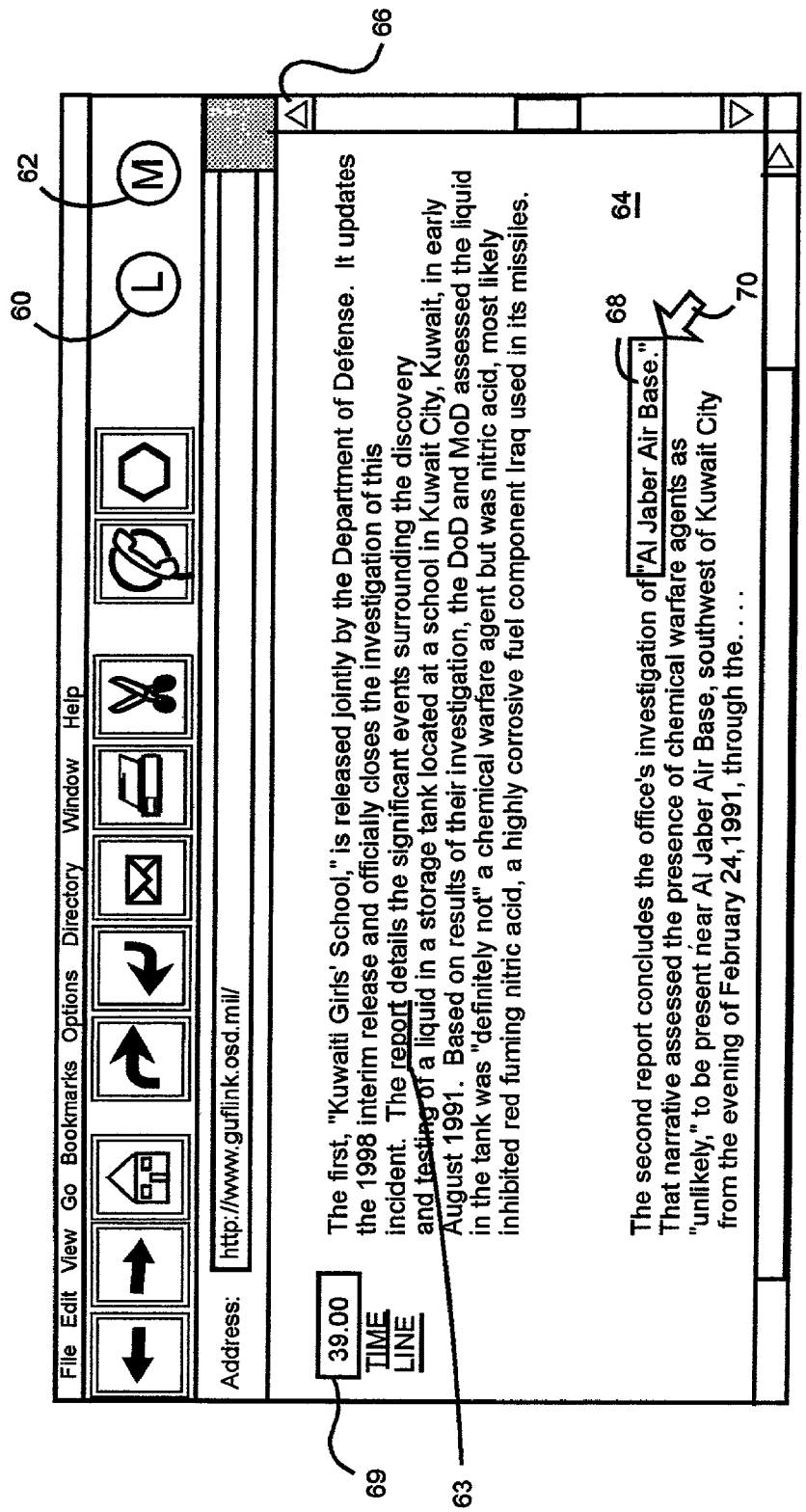
FIG. 8 is the diagrammatic display view of FIG. 6 illustrating a subsequent point in the Web page at which a hyperlink to a linked document is selected.
Figure 9:
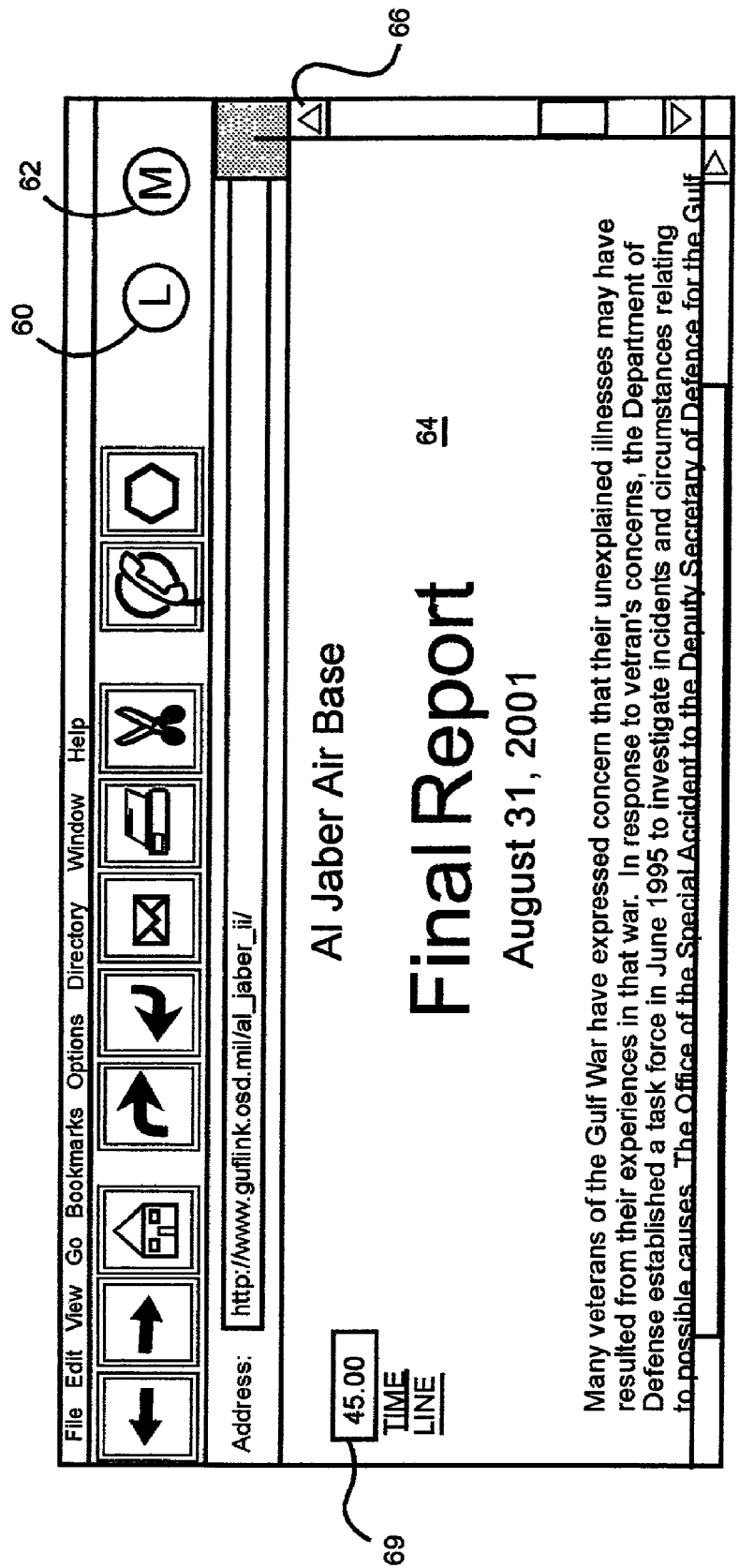
FIG. 9 is a diagrammatic view of the displayed linked Web page resulting from the selection of the hyperlink selected in FIG. 8.
Figure 10:
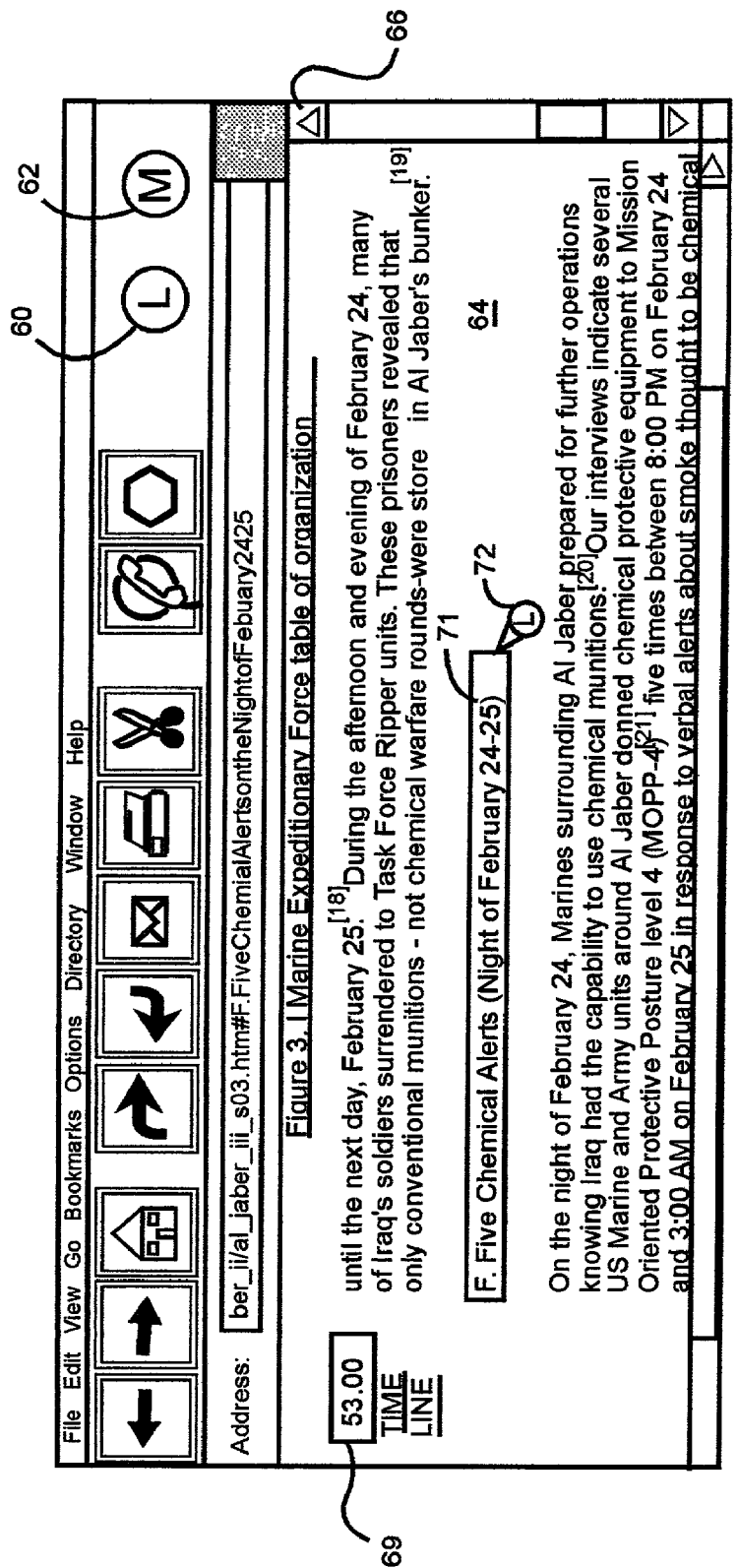
FIG. 10 is the diagrammatic display view of FIG. 9 illustrating a subsequent point in the Web page at which a hyperlink selected for a later look, delay for subsequent consideration.
Figure 11:
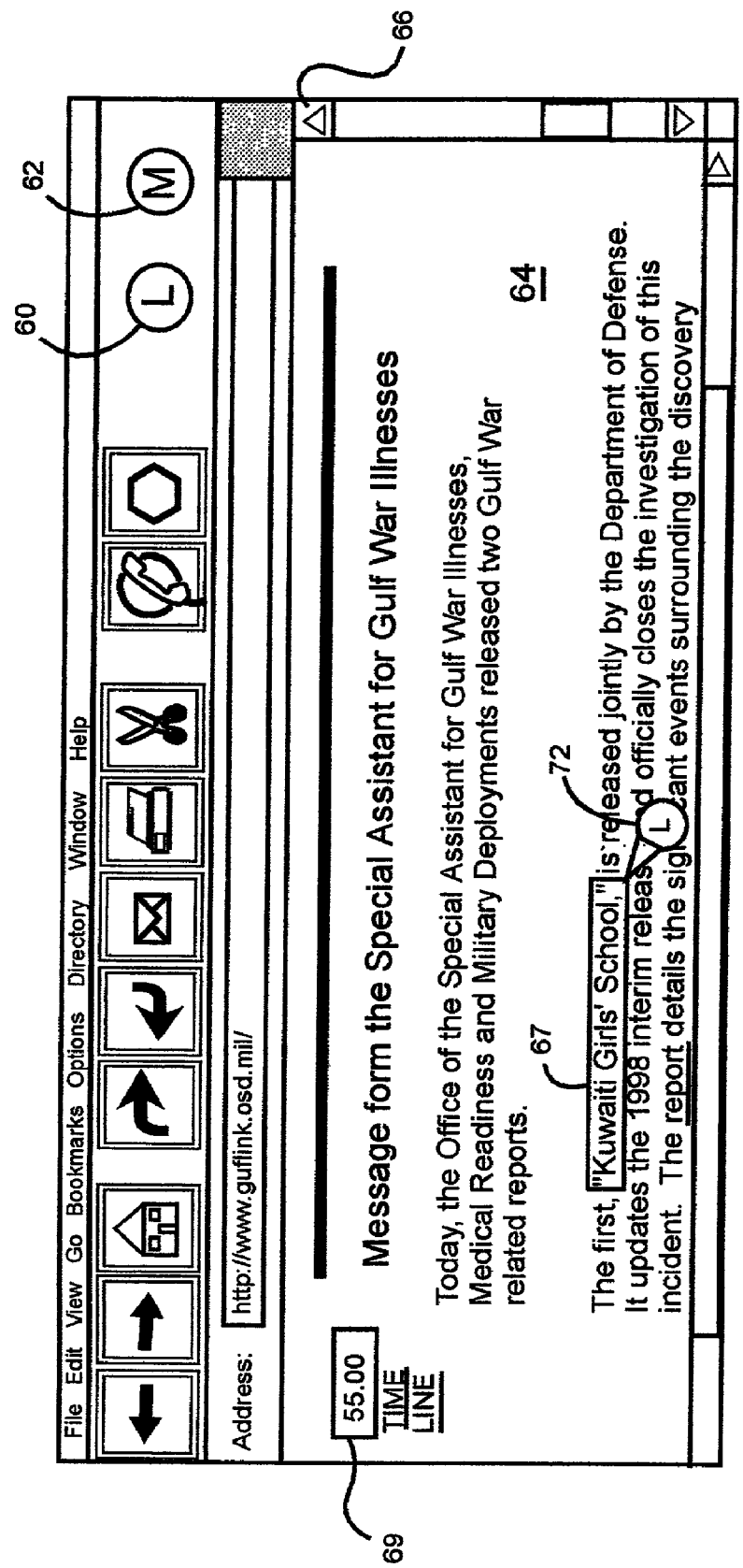
FIG. 11 is the diagrammatic display view of FIG. 7 illustrating a point in the Web page at which a hyperlink selected for a later look, delay for subsequent consideration.
Figure 13:
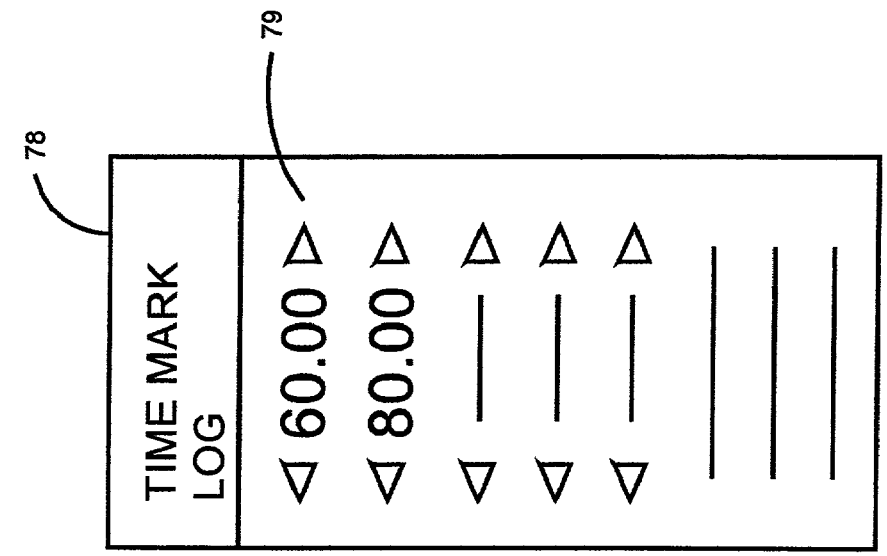
FIG. 13 is a diagrammatic illustration a Look-at-Link-Later Log and a Time Mark Log that may be used in the present invention.
Figure 13:
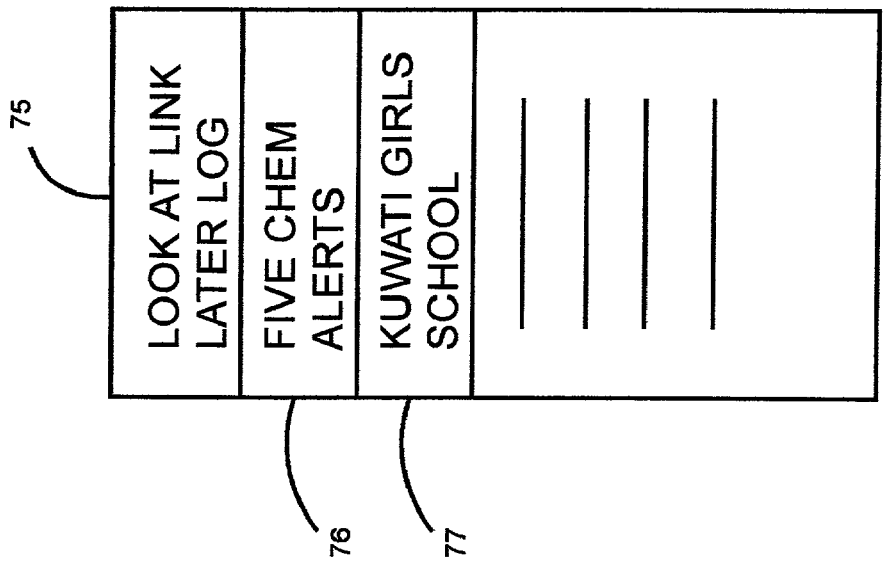

With this background relative to the implementation of the real-time recording of navigation in a Web browsing session, the scrolling of Web page 64 from FIG. 3 to FIG. 4 is recorded along with time line 61, as is the further scrolling from the Web page of FIG. 4 to a point in FIG. 5 where the user, via pointer 70, clicks on hyperlink 65 causing the navigation to jump to the linked Web page shown in FIG. 6, "Gulf War Illnesses". The jump is, of course, recorded real-time as indicated along time line 61. The recorded scrolling continues in the "Gulf War Illness" Web page as shown in FIG. 7. The recording of time line continues but just for convenience in illustration, the line 61 is replaced by a changing time label 69 that continues to track the time. As shown in FIG. 8, the recorded scrolling in the linked Web page continues until a further hyperlink 68 is selected through pointer 70 which in turn brings up a subsequent linked Web page, "Al Jaber Air Base", as illustrated in FIG. 9. As the recorded scrolling in the Al Jaber Air Base Web page continues, FIG. 10, a link 71 is selected but not for immediate viewing. Link 71 is to be stored in accordance with the process of the above Cross-Referenced application for later possible viewing of its linked document. This is done by clicking on button 60 which results in the display of "L" point 72. By pointing and clicking on hyperlink 71, this hyperlink is stored as item 76 in the "Look-at-Link-Later Log" 75 shown in FIG. 13 in accordance with the process of the Cross-Referenced application. The scrolling, as recorded real-time, then backs up again in the "Gulf War Illness" Web page as shown in FIG. 11 where hyperlink 67 is similarly selected for later viewing and thereby becomes item 77 in Log 75 of FIG. 13.

As previously mentioned, the invention also provides for time marking of time points in the recorded Web navigation during a browsing session in order to bring significant points in the subsequent surrogate browsing session to the attention of the user. With reference to FIG. 11, to time mark, the user simply clicks on button 62 "M" which stores the time on the time line at the time of the selection as a time mark 79 in Time Log 78 shown in FIG. 13.

Since the basic Web browsing session has been recorded on a real-time basis, the subsequent surrogate browsing will be played back substantially with the same image sequence. FIG. 12 is an example of a typical display screen in a surrogate or real-time playback mode. If time marks have been stored, then this may be brought to the user's attention by the display of a time mark button 73 that the user may click on in order to display a Time Mark Log, e.g. Log 73 of FIG. 13. The user may then click on any of the marks in the log, and jump the surrogate session to that real-time point in the sequence. Optionally, the time mark 79 may also include a textual identifier to indicate the nature of the content at that time mark. Also, in the surrogate mode, the user may click on "L" button 60 to bring up the Look-at-Link-Later Log 75 of FIG. 13.

In the surrogate or playback mode shown in FIG. 12, the user may modulate the playing speed of the real-time surrogate browsing though interactive <Slow---Fast> gauge 80 to suit the browsing needs of the surrogate user. With such modulation of playback speed, the Java program for repainting screens described above may be correspondingly adjusted to vary the intervals between the repainting of the screen to accommodate such modulation. If the surrogate session is stored on a tape cassette player, like the Sony Beta-Cam, it has a built-in capability of varying the tape playback speed in response to user input.

Figure 14:
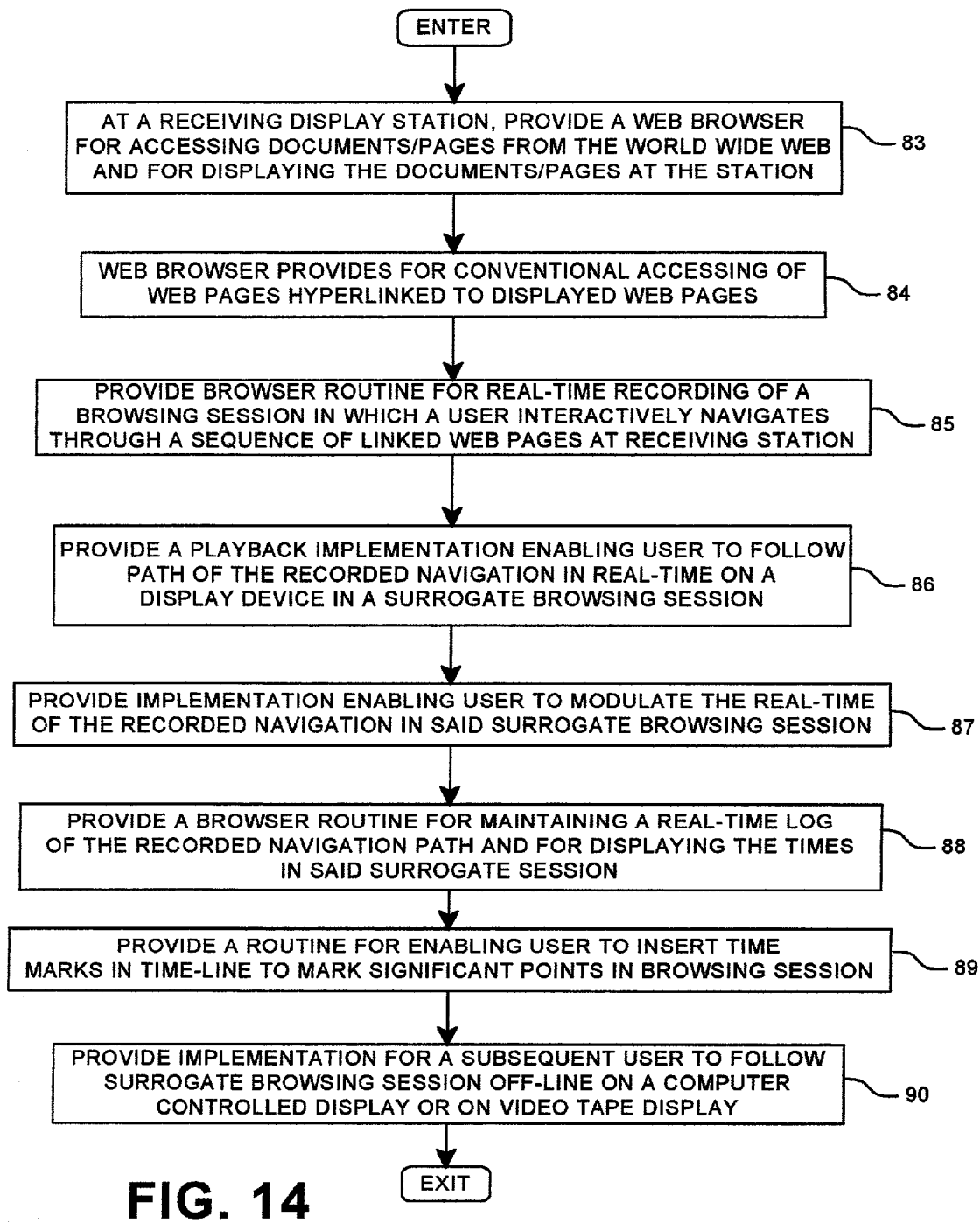
FIG. 14 is an illustrative flowchart describing the setting up of the process needed in the Web browser for enabling a user to provide a surrogate Web browsing session.

FIG. 14 is a flowchart showing the development of a process according to the present invention for recording a Web browsing session on a real-time basis for subsequent real-time playback in a surrogate browsing session. There is provided at a receiving display station, a Web browser for accessing Web pages or documents and for displaying the same, step 83. Web browsers also provide for the accessing of Web pages and other documents hyperlinked to displayed Web pages, step 84. There is provided a browser routine for real-time recording of a Web browsing sessions during which the user interactively navigates through a sequence of linked Web pages at a receiving display station, step 85. There is provided a playback implementation enabling the user to follow the path of the recorded navigation in real-time on a display device in a surrogate browsing session, step 86. An implementation is provided whereby a user may modulate the real-time of the recorded navigation during the surrogate browsing session, step 87. A browser routine is provided for maintaining a Real-Time Log of the recorded navigation path and for displaying the times of the navigation in the surrogate session, step 88. A routine is provided enabling the user to insert time marks in the time line to mark significant points in the browsing session, step 89. Lastly, an implementation is provided so that the subsequent user or principal who ordered the Web browsing session may follow the surrogate browsing session off-line, e.g. on a computer controlled display or videotape display, step 90.

Figure 15:
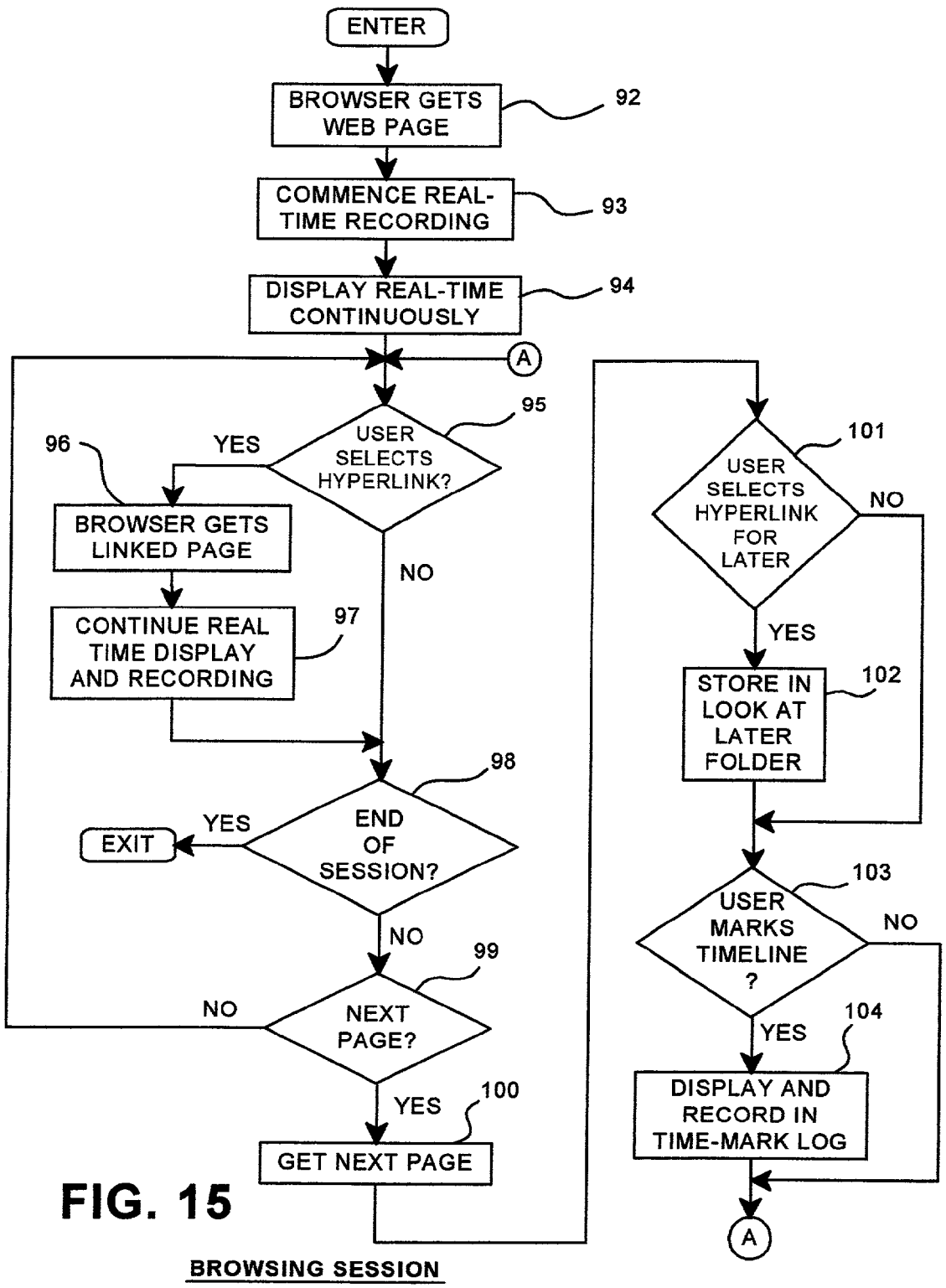
FIG. 15 is a flowchart of an illustrative run of a process for recording a Web browsing session on a real-time basis.
Figure 16:
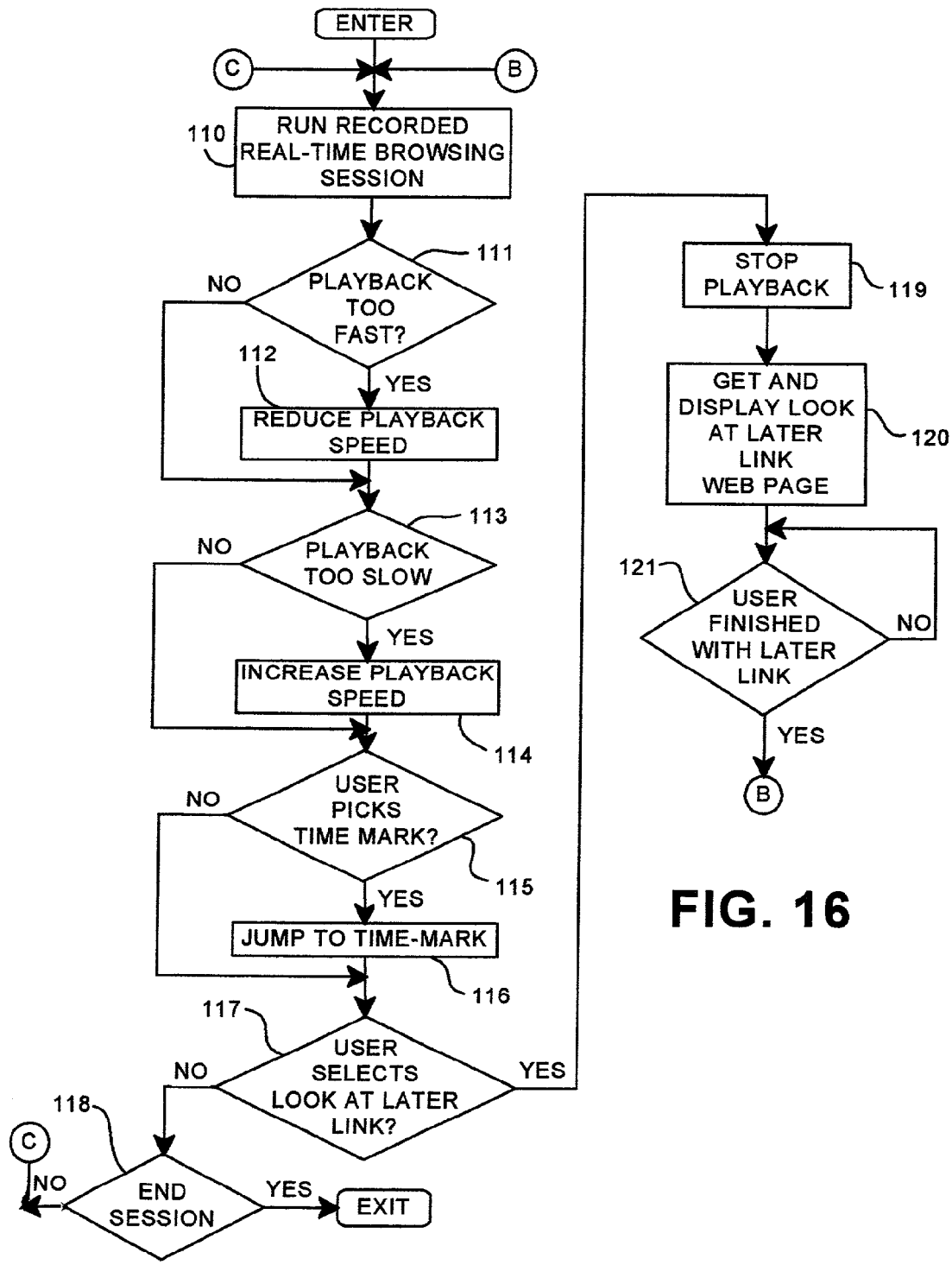
FIG. 16 is a flowchart of an illustrative run of a process enabling a user to subsequently view Web browsing sessions recorded in FIG. 15 as a surrogate Web browsing session.

The running of the process set up in FIG. 14 will now be described with respect to the flowchart of FIGS. 15 and 16. Let us assume that we are in a Web browsing session through the browser that we are to record on a real-time basis. The flowchart of FIG. 15 represents some illustrative steps in such a recording routine. The browser, via a Web server, accesses the pages found by a search engine, step 92; thus, the next Web page is accessed. The real-time recording has commenced, step 93, and the real-time is continuously displayed, either as a line or as a changing time label, step 94. As the recorded browsing session progresses, a determination is made as to whether the user has selected a hyperlink in a displayed Web page, step 95. If Yes, the browser gets the linked page, step 96, and displays it; while, step 97, the continuous real-time session is displayed. At this point, or if the decision at step 95 is No, a hyperlink has not been selected, then, step 98, a determination may conveniently be made as to whether the session is over. If Yes, the session is exited. If No, then at step 99, a further determination is made as to whether the user has selected a next Web page. If Yes, the next selected Web page is retrieved and displayed, step 100. If No, the session returns to step 95 where the selection of the next hyperlink is awaited. After step 100, a determination is made, step 101, as to whether the user has chosen to select a hyperlink to be stored in Look-at-Link-Later Log of FIG. 13. If Yes, the link is stored in this log, step 102. Then, or if the decision from step 101 is No, a determination is made as to whether the browser made a time mark on the time line at this point, step 103. If Yes, then, step 104, the time mark is indicated on the display and stored in the Time Mark Log of FIG. 13. Then, or if the decision from step 103 is No, the process proceeds via branch "A" to step 95 where the selection of the next hyperlink is awaited.

Now, with respect to the flowchart of FIG. 16, an illustration of the recorded surrogate browser session will be described. The run of the recorded Web browser session is commenced, step 110. A determination is made as to whether the playback in the surrogate session is too fast, step 111. If Yes, the playback speed is reduced, step 112. Then, or if the decision in step 111 is No, a further determination is made as to whether the playback in the surrogate session is too slow, step 113. If Yes, the playback speed is increased, step 114. Then, or if the decision in step 113 is No, a determination is made, step 115, as to whether the user has selected a time mark from the Time Mark Log. If Yes, the surrogate session jumps to the session point of the time mark, step 116. Then, or if the decision in step 115 is No, a determination is made, step 117, as to whether the user has selected a stored link from the Look-at-Link-Later Log of FIG. 13. If Yes, then the real-time playback of the surrogate session is stopped, step 119, and the selected Look-at-Link-Later Web page is retrieved and reviewed, step 120. A determination is made, step 121, as to whether the user has completed reviewing the Web page retrieved in step 120. If No, this completion is awaited. If Yes, then the process is branched back via branch "B" to step 110 where the run of the recorded Web browser session is recommenced. On the other hand, if the decision back at step 117 is No, a determination may conveniently be made at this point as to whether the session is at an end, step 118. If Yes, the session is ended. If No, then the process is branched back via branch "C" to step 110 where the run of the recorded Web browser session is continued.

One of the preferred implementations of the present invention is in application program 40, i.e. a browser program made up of programming steps or instructions resident in RAM 14, FIG. 1, of a Web receiving station and/or Web server during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a Local Area Network (LAN) or a Wide Area Network (WAN), such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World wide Web (Web) communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, a system for generating surrogate Web browsing sessions comprising:
    means enabling a user to interactively navigate the Web through a sequence of linked hypertext documents in a browsing session at a receiving display station;
    means for recording on a real-time basis said interactive navigation of said user in said browsing session;
    means enabling a subsequent user to follow the path of said recorded navigation on a real-time basis in a surrogate browsing session on a display device;
    means enabling said subsequent user following said path of said recorded navigation in said surrogate session to modulate the real-time of said navigation on said display device; and
    means enabling said subsequent user to select a recorded but previously unselected hyperlink to thereby access a linked hypertext document.

2. The system for generating surrogate Web browsing sessions of claim 1 wherein said recorded navigation includes scrolling through a Web document.

3. The system for generating surrogate Web browsing sessions of claim 1 wherein said recorded navigation includes selecting a hyperlink in a displayed Web document to access and display the respective linked hypertext document.

4. The system for generating surrogate Web browsing sessions of claim 1 further including:
    means for recording a real-time line for said recorded navigation; and
    means for displaying said recorded real-time line in said surrogate Web browsing session.

5. The system for generating surrogate Web browsing sessions of claim 4 further including:
    means enabling said user to insert time marks in said real-time line to indicate significant points in said browsing session.

6. The system for generating surrogate Web browsing sessions of claim 5 wherein an inserted time mark coincides with said navigation reaching a specific hyperlink in a hypertext document during said browsing session.

7. The system for generating surrogate Web browsing sessions of claim 1 wherein said surrogate session is carried out off-line from said Web network.

8. The system for generating surrogate Web browsing sessions of claim 4 further including a user interactive Web browser at said receiving display station, said browser including:
    said means enabling a user to interactively navigate the Web through a sequence of linked hypertext documents in a browsing session at a receiving display station;
    said means for recording on a real-time basis said interactive navigation of said user in said browsing session; and
    said means for recording a real-time line for said recorded navigation.

9. The system for generating surrogate Web browsing sessions of claim 8 wherein said display device is a video cassette player and said navigation in said browsing session is recorded on video tape.

10. The system for generating surrogate Web browsing sessions of claim 8 wherein said display device is a computer controlled display having means for storing the recorded real-time interactive navigation.

11. In a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, a method for generating surrogate Web browsing sessions comprising:
    enabling a user to interactively navigate the Web through a sequence of linked hypertext documents in a browsing session at a receiving display station;
    recording on a real-time basis said interactive navigation of said user in said browsing session;
    enabling a subsequent user to follow the path of said recorded navigation on a real-time basis in a surrogate browsing session on a display device;
    enabling said subsequent user following said path of said recorded navigation in said surrogate session to modulate the real-time of said navigation on said display device; and
    enabling said subsequent user to select a recorded but previously unselected hyperlink to thereby access a linked hypertext document.

12. The method for generating surrogate Web browsing sessions of claim 11 wherein said recorded navigation step includes scrolling through a Web document.

13. The method for generating surrogate Web browsing sessions of claim 11 wherein said recorded navigation step includes selecting a hyperlink in a displayed web document to access and display the respective linked hypertext document.

14. The method for generating surrogate Web browsing sessions of claim 11 further including the steps of:
    recording a real-time line for said recorded navigation; and
    displaying said recorded real-time line in said surrogate Web browsing session.

15. The method for generating surrogate Web browsing sessions of claim 14 further including the step of:
    enabling said user to insert time marks in said real-time line to indicate significant points in said browsing session.

16. The method for generating surrogate Web browsing sessions of claim 15 wherein an inserted time mark coincides with said navigation reaching a specific hyperlink in a hypertext document during said browsing session.

17. The method for generating surrogate Web browsing sessions of claim 11 wherein said surrogate session is carried out off-line from said Web network.

18. The method for generating surrogate Web browsing sessions of claim 14 further including a user interactive Web browser method carried out at said receiving display station, said browser method including said steps of:
- enabling a user to interactively navigate the Web through a sequence of linked hypertext documents in a browsing session at a receiving display station;
- recording on a real-time basis said interactive navigation of said user in said browsing session; and
- recording a real-time line for said recorded navigation.

19. A computer program having code recorded on a computer readable medium for generating surrogate Web browsing sessions in a Web communication network with user access via a plurality of data processor controlled interactive receiving display stations for displaying received hypertext documents of at least one display page containing text, images and a plurality of embedded hyperlinks, each hyperlink being user selectable to access and display a respective linked hypertext document, said computer program comprising:
- means enabling a user to interactively navigate the Web through a sequence of linked hypertext documents in a browsing session at a receiving display station;
- means for recording on a real-time basis said interactive navigation of said user in said browsing session;
- means enabling a subsequent user to follow the path of said recorded navigation on a real-time basis in a surrogate browsing session on a display device;
- means enabling said subsequent user following said path of said recorded navigation in said surrogate session to modulate the real-time of said navigation on said display device; and
- means enabling said subsequent user to select a recorded but previously unselected hyperlink to thereby access a linked hypertext document.

20. The computer program of claim 19 wherein said recorded navigation includes scrolling through a Web document.

21. The computer program of claim 19 wherein said recorded navigation includes selecting a hyperlink in a displayed Web document to access and display the respective linked hypertext document.

22. The computer program of claim 19 further including:
- means for recording a real-time line for said recorded navigation; and
- means for displaying said recorded real-time line in said surrogate Web browsing session.

23. The computer program of claim 22 further including:
- means enabling said user to insert time marks in said real-time line to indicate significant points in said browsing session.

24. The computer program of claim 23 wherein an inserted time mark coincides with said navigation reaching a specific hyperlink in a hypertext document during said browsing session.

25. The computer program of claim 19 wherein said surrogate session is carried out off-line from said Web network.

26. The computer program of claim 22 further including a user interactive Web browser program at said receiving display station, said browser program including:
- said means enabling a user to interactively navigate the Web through a sequence of linked hypertext documents in a browsing session at a receiving display station;
- said means for recording on a real-time basis said interactive navigation of said user in said browsing session; and
- said means for recording a real-time line for said recorded navigation.

27. The computer program of claim 26 wherein said display device is a video cassette player and said navigation in said browsing session is recorded on video tape.

28. The computer program of claim 26 wherein said display device is a computer controlled display having means for storing the recorded real-time interactive navigation.

* * * * *